Dec. 27, 1960
R. H. WISE
2,966,070
MOTION CONVERSION UNIT
Filed Dec. 2, 1955
3 Sheets-Sheet 1
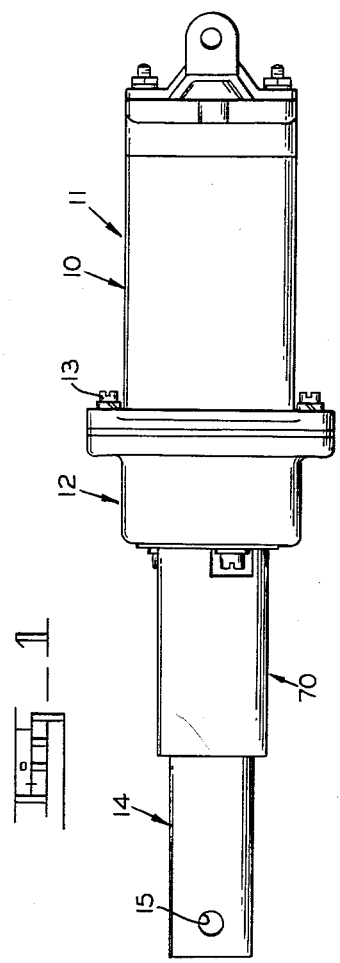
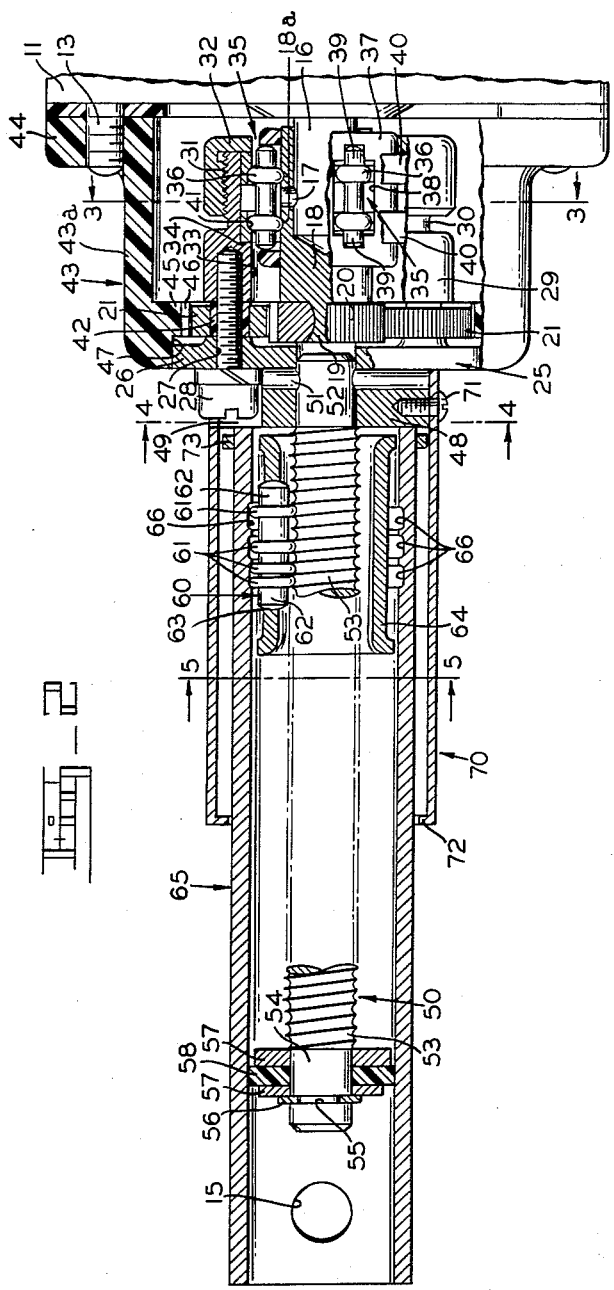
INVENTOR.
RALPH H. WISE
BY *H. P. Settle Jr*
*Wesley B. Taylor*
ATTORNEYS Dec. 27, 1960 R. H. WISE 2,966,070
MOTION CONVERSION UNIT
Filed Dec. 2, 1955 3 Sheets-Sheet 2
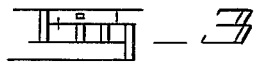
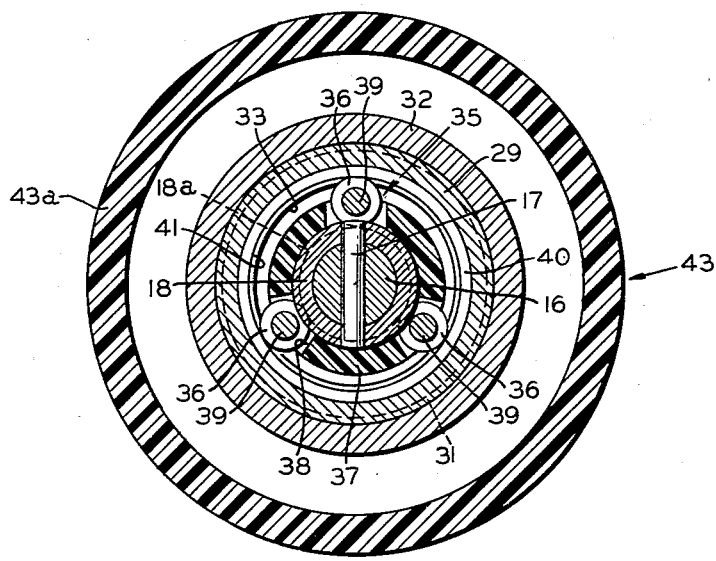
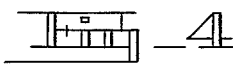
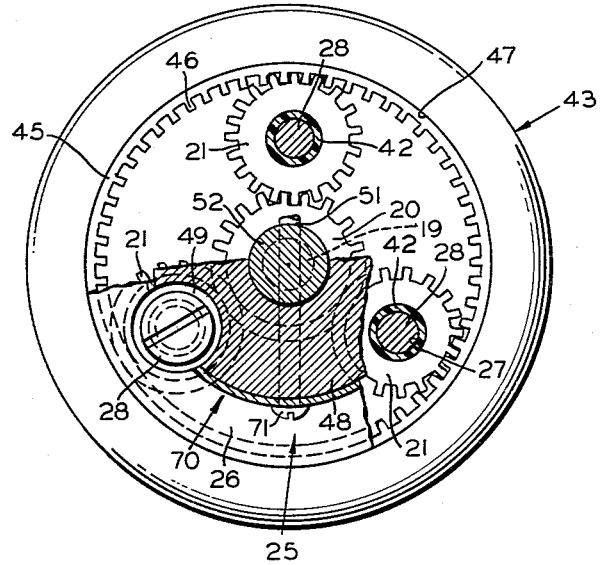
INVENTOR.
RALPH H. WISE
H. P. Settle Jr.
Wesley B. Taylor
ATTORNEYS

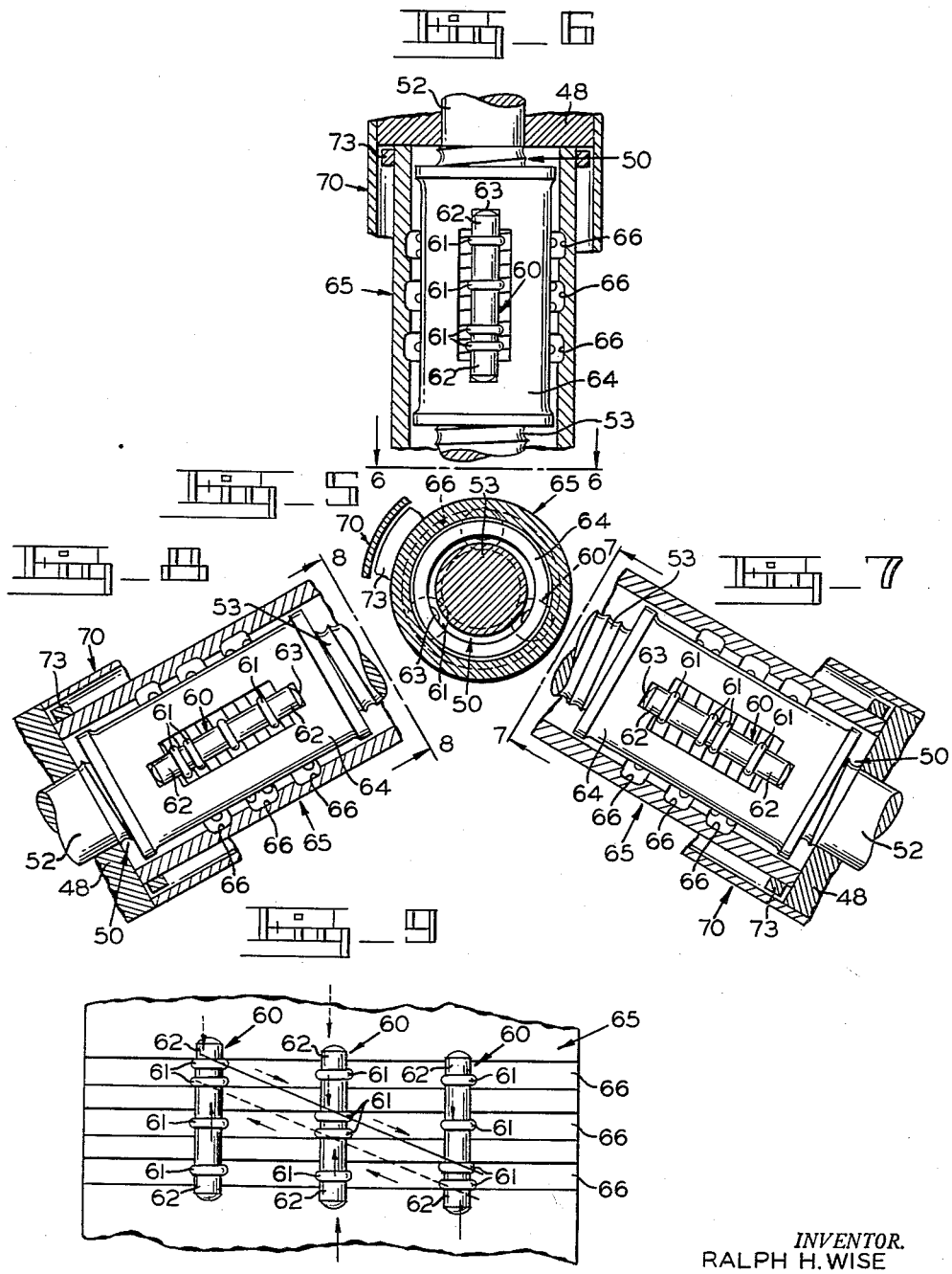

United States Patent Office 2,966,070
Patented Dec. 27, 1960

2,966,070

MOTION CONVERSION UNIT

Ralph H. Wise, Gary, Ind., assignor, by mesne assignments, to The Anderson Company, a corporation of Indiana Filed Dec. 2, 1955, Ser. No. 550,705

3 Claims. (Cl. 74—424.8)

The present invention relates to a motion conversion unit and more particularly to a unit for converting rotary motion to linear motion at a changed speed.

The present application is a continuation-in-part of my earlier filed copending application Serial No. 536,515, filed on September 26, 1955.

In my earlier filed application, there is disclosed a power drive unit for the conversion of rotary motion to translatory motion for the adjustment of a vehicular seat, or for other and different purposes, such as the actuation of a top for a convertible vehicle, the actuation of a tractor-lift mechanism, and the like. The device of the instant invention is usable for similar purposes, and is particularly adapted for use in actuating loads in excess of those which may be actuated by use of the earlier disclosed device.

The present invention proposes the utilization of a pair of reduction drive units, preferably of the planetary type, which have a cumulative or compound speed-reducing and torque-multiplying function. The first of these units preferably takes the form of a planetary gear set in which an input gear member, preferably a sun gear, is driven by a source of power, such as an electric motor, to drive planetating pinion gears or the like. The pinion gears preferably mesh with a fixed ring gear, so that a planet carrier or other output member joining the pinions is driven at a reduced speed. The output member is connected to the input member of a second planetary reduction drive unit in which second unit the input member is a screw having a threaded periphery of appreciable axial lead. In engagement with the screw thread are a plurality of thrust elements joined by a carrier and capable of both planetating and axial movement relative to the screw. The thrust elements are in thrust engagement with a thrust collar or the like which is held against rotation but which is advanced axially upon rotation of the screw. The thrust collar forms the output member of the reduction drive units and is utilized to actuate the load.

The utilization of the pair of planetating drive units results in the provision of a high-load thrust unit in which (1) the speed of actuation is greatly reduced, thus making practical the use of high speed, small size electric motors as the source of power, (2) a great mechanical advantage, inversely proportional to the speed ratio, is obtained, and (3) the speed reduction and proportional mechanical advantage is the product of the mechanical advantages of the planetary gear set, the planetating reduction drive unit, and the threaded screw.

One important feature of the device is the provision of a double thrust, antifriction bearing which rotatably supports one gear element of the first unit, preferably the carrier, and to which the entire axial thrust loads imposed upon the assembly are directly transmitted without subjecting the planetary gear set, per se, to such loads. The same element which is supported upon the thrust bearing is utilized to halt longitudinal movement of the thrust collar at either end of its actuating stroke, so that the loads imposed on the unit at the termination of its working cycle are also imposed directly upon the thrust bearing. This bearing arrangement results in the provision of a simple, compact, and efficient actuating device wherein only one thrust bearing need be utilized.

It is, therefore, an important object of the present invention to provide an improved device for converting rotary motion to linear motion at a changed rate.

Another important object of this invention is the provision of an improved motion-translating and speed-changing device including a pair of reduction drive units, one driving the other, and one of the units having an output member which is non-rotatable, but axially movable.

It is a further object to provide an improved motion-converting and speed-changing device wherein a pair of planetary reduction drive units are utilized to drive an output member linearly with all of the linear loads imposed on the output member being transmitted to a single bearing capable of accommodating multiple directional thrust loads.

Yet another object of the present invention is the provision of a motion conversion unit wherein a first planetary reduction drive unit, including axially fixed, mutually rotatable input and output gearing elements, is utilized to drive a second planetary reduction unit having an input member driven by an output member of the first unit and an output member movable only linearly at a speed determined by the cumulative reduction ratios of the two units.

Other and further objects of the present invention will become apparent from a study of the detailed description of the invention hereinafter set forth and the appended drawings.

In the drawings:

Figure 1 is a side elevation view of a motion conversion unit of the present invention;

Figure 2 is a longitudinal sectional view of the unit of Figure 1, with parts shown in elevation;

Figure 3 is an enlarged sectional view taken along the plane 3—3 of Figure 2;

Figure 4 is an enlarged sectional view taken along the plane 4—4 of Figure 2;

Figure 5 is a sectional view taken along the plane 5—5 of Figure 2;

Figure 6 is a sectional view taken along the plane 6—6 of Figure 5;

Figure 7 is a sectional view taken along the plane 7—7 of Figure 5;

Figure 8 is a sectional view taken along the plane 8—8 of Figure 5; and

Figure 9 is a view illustrating the axial thrust forces acting upon the rotatable elements of the device illustrated in Figures 1-8, inclusive.

As shown in the drawings:

In Figure 1 reference numeral 10 refers generally to a motion-converting device of the present invention. As earlier explained, the device is usable in the same manner as that disclosed in my earlier filed application, Serial No. 536,515.

The device, as illustrated in Figure 1, includes a source of power, such as an electric motor enclosed within a housing 11, a first planetary reduction unit enclosed within a second housing section 12 connected to the housing 11 by suitable means, as by screws 13, and a second reduction drive unit enclosed within a telescopically movable output member 14 provided with means, such as apertures 15, for connecting the output member 14 to the device to be actuated.

As best illustrated in Figures 2, 3 and 4, the motor enclosed within the housing 11, but not illustrated in detail, is provided with an output shaft 16 which is connected, as by a drive pin 17, to an input member 18 of a first planetary reduction drive unit. The input member 18 has a reduced free end 19 to which is keyed, or otherwise nonrotatably connected, a pinion gear 20 which forms the sun gear of a planetary gear set. The sun gear 20 meshes with a plurality, three in the illustrated embodiment, of planet pinions 21 which are rotatably disposed upon a planetating carrier, indicated generally at 25. The carrier 25 comprises a medial radially enlarged flange 26 which is apertured, as at 27, to receive screws 28 which extend through the planet pinions 21 and into a generally cylindrical inner carrier section 29 for threaded reception therein. The carrier section 29 is reduced adjacent its inner end, as at 30, and is threaded, as at 31, to receive a bearing cap 32.

The carrier section 29 is also provided with an axial open-ended bore 33 which is counterbored to provide a radial shoulder 34. The input member 18 is provided, at its outer periphery, with axially spaced peripheral grooves 18a which receive a plurality of peripherally spaced bearing elements 35. More specifically, these bearing elements 35 are each generally cylindrical in contour and are provided with axially spaced, radially enlarged, peripheral bearing portions 36. These bearing portions 36 are of toroidal exterior peripheral contour and extend into the grooves 18a. The bearing elements 35 are retained by a generally cylindrical bearing retainer 37 having cruciform openings 38 which are provided with reduced extremities to snugly receive the pintle ends 39 of the bearing elements and with enlarged medial portions freely receiving the toroidal bearing portions 36. Interposed between the bearing elements 35 and the carrier portion 29 are a pair of axially spaced annular races 40 provided with shoulders 41 at their inner peripheries adapted to receive the bearing portions 36 thereagainst. The inner bearing race 40 abuts the shoulder 34 of the carrier element 29, while the outer bearing race 40 is abutted by the bearing cap 32. The bearing races are held in their axially spaced relation by the enlarged bearing portions 36 interposed between the shoulders.

The bearing elements 35 thus rotatably support the carrier 25 upon the input member 18. Additionally, any axial thrust loads imposed upon the carrier will be transmitted by the double thrust bearing construction to the input member 18 and hence directly to the motor drive shaft 16 which is fixedly secured to the input member 18. The motor drive shaft is normally disposed upon thrust bearings (not shown) and can well accommodate such thrust loads as may be transmitted thereto.

The planet pinions 21 are disposed on the carrier 25 by means of the screws 28 and are free to rotate relative thereto about antifriction plain bearings 42, preferably formed of nylon, or other suitable material. The planet pinions mesh with a fixed ring gear, indicated generally at 43. The ring gear comprises a cylindrical attaching section 43a having a radially enlarged peripheral flange 44 secured, as by the screws 13, to the motor housing 11, and a radially inturned flange 45 provided with interior teeth 46 which form the actual ring gear. The ring gear 43 is provided, at its end opposite the flange 44, with an open-ended bore 47 which guidably, but rotatably, pilots the outer peripheral surface of the carrier 25.

It will be appreciated that rotation of the drive shaft 16 of the motor will rotate the input member 18 and the sun gear 20 at motor shaft speed. Rotation of the sun gear will effect rotation of the planet pinions 21, and the planet pinions 21 being meshed with the fixed ring gear 43 will be forced to move peripherally about the sun gear in a planetating motion. The carrier 25 will also planetate and will be driven at a speed less than the speed of rotation of the input member 18. Thus, a complete planetary gear set is provided with an input member (sun gear 20), a fixed reaction member (ring gear 43) and a planetating output member (carrier 25) driven at a speed proportional to, but less than, the speed of the input member.

The carrier 25 is provided with an axially extending hub portion 48 of reduced diameter which is recessed, as at 49, to accommodate the heads of the screws 28 (Figure 2). The hub 48 is connected to the input member of a second planetary reduction drive unit, this input member being in the form of a screw indicated generally at 50, and being joined to the carrier by suitable means, as by a drive pin 51. The screw 50 more specifically includes a cylindrical pilot portion 52 insertable into a central bore formed in the carrier and secured therein by the pin 51, and an outer peripherally threaded portion 53 which provides a helical thread of substantial axial lead. The threaded portion 53 terminates adjacent the outer end of the screw, with a terminal pilot portion 54 of the screw being provided with a lock washer groove 55 within which is seated lock washer 56 retaining a plurality of axially aligned guiding elements thereon. These guiding elements include a pair of washers 57 having interposed therebetween a guide element 58, preferably formed of nylon or the like, for cooperation with the output member of the second reduction drive unit in a manner to be hereinafter more fully described.

The helical thread 53 of the screw 50 is engaged by a plurality of thrust members 60 of the type described in detail in my hereinbefore-mentioned pending application, Serial No. 536,515. These thrust members 60 are provided with a plurality of axially spaced, peripherally enlarged, toroidal thrust faces which engage the screw threads. The reduced end portions 62 of thrust elements form pilot portions which are snugly received in apertures 63 formed in a carrier 64, the carrier being generally cylindrical and serving to maintain the individual thrust elements 60 in peripherally spaced relation and in axial alignment with the threaded input member 50. As best shown in Figures 2 and 9, the thrust faces 61 of the thrust elements 60 are engaged with shoulders formed by axially spaced, inner peripheral recesses 66 formed in the output member of the second reduction drive unit indicated generally at 65. This output member 65 preferably takes the form of a cylindrical thrust collar which is held against rotation by its connection to the device to be actuated, as by the apertures 15.

The second planetary reduction drive unit thus comprises an input member (screw 50), a planetating assembly (the thrust elements 60 and the carrier 64) and a rotationally fixed, but axially movable, combined reaction member and output member (the thrust collar 65). Rotation of the shaft or screw 50 will effect axial and rotational movement of the thrust elements 60, since these elements are interposed between the rotating screw and the nonrotatable thrust collar, and axial movement of the thrust elements must necessarily effect axial movement of the thrust collar 65 because of the thrust engagement of the toroidal surfaces 61 with the collar shoulders provided by the grooves 66.

Axial travel of the collar toward the motor housing 11 is limited by abutment of the collar with the end surface of the carrier boss 48. To limit movement of the collar away from the motor housing 11, there is provided a combination stop sleeve and thread protection sleeve indicated generally at 70 which is secured to the carrier by suitable means, as by drive screws 71. The stop collar 70 telescopically receives the thrust collar 65 therein and terminates in an annular stop flange 72 turned inwardly toward the thrust collar and adapted to be abutted by an outer peripheral stop surface 73 formed integrally with or fixedly secured to the outer periphery of the thrust collar adjacent its inner end.

*Operation*

The operation of the device of the present invention will be readily understood from the foregoing description, but certain structural and functional advantages residing therein will be better appreciated by virtue of the following explanation.

The thrust collar 65, which provides the actuating member of the assembly, is movable axially at a rate which is proportional to, but substantially different from the rate of rotation of the motor output shaft 16. This speed difference results from the compound and cumulative speed reduction which is obtained with and as a result of the operation of the two correlated planetary reduction drive units. The first planetary reduction drive unit is actually the planetary gear set provided by the input sun gear 20, the planetary pinions 21, the fixed ring gear 43 and the planetating carrier 25. This gear set is connected to a second planetating reduction drive unit by the interconnection of the output member of the gear set, namely the carrier 25, to the input member of the second reduction drive unit, namely the screw 50. The second reduction drive unit comprises the screw 50, the planetating thrust element 60 and the carrier 64, and the combined reaction member and output member 65. The screw 50 provides an additional reduction over and above the planetating operation of the second unit.

Thus, the speed reduction which results from this combination makes possible the use of a high speed, relatively low torque output motor to actuate a relatively heavy load, inasmuch as the mechanical advantage obtained within a unit is inversely proportional to the speed reduction within the combination.

The advantages of the present device will be readily appreciated by those skilled in the art.

The device also possesses another feature in that all of the axial thrust loads imposed upon the device are transmitted directly to the source of power through a single bearing. More specifically, the double thrust bearing provided by the bearing elements 35 receive all of the axial thrust loads generated during actuation. Upon movement of the thrust collar 65 axially outwardly or axially inwardly relative to the motor housing 11, these forces upon the thrust collar are transmitted through the thrust elements 60 to the screw threads 53 and through the screw 50 and the pin 51 to the carrier 25 and through the carrier directly to the bearing races 40. The bearing elements 35 transmit these forces directly to the motor drive shaft 16. Upon stopping of axially inward movement of the thrust collar 65 by abutting the thrust collar directly with the carrier, the forces are again directly transmitted to the drive shaft 16. Axially outward movement of the thrust collar 65 is halted when the abutment 73 on the collar contact the stop flange 72 on the stop collar or sleeve 70 which forces are again transmitted directly to the carrier 25 and hence to the drive shaft 16. Incidentally, it will be noted that the stop sleeve may be relatively thin in cross section, since only tensile loads are imposed upon this sleeve or collar during stopping of the thrust collar 65.

Various details of construction may be changed through a wide range without departing from the principles of this invention, and it is, therefore, not the purpose to limit the patent granted hereon otherwise than necessitated by the scope of the appended claims.

I claim:

1. In a device for converting rotary motion to linear motion at a differential speed, a source of power, a rotary input member connected to said source, a planetary change-speed gear set including a sun gear driven by the input member, a fixed ring gear, a carrier, a plurality of planet pinions interposed between the ring gear and the sun gear and carried by said carrier for planetating movement, a bearing interposed between said carrier and said input member, a screw operatively connected to said carrier in axial thrust relation thereto and driven thereby at a rotational speed substantially less than the rotational speed of said input member, said screw having a peripheral thread of appreciable axial lead, a plurality of thrust elements engaging the thread of said screw for axial and rotational movement relative thereto, an element carrier supporting said thrust elements and movable in a planetating path relative to said screw, a thrust collar in thrust relation with said elements for only axial movement relative to said screw, and stop means on said planet pinion carrier abuttable with said thrust collar for limiting movement of the collar in either axial direction, the axial thrust of said thrust collar being transmitted through said thrust elements and said screw to the planet pinion carrier during travel of the thrust collar between its extremes of axial movement, the axial thrust load on said collar being transmitted directly to said carrier when the thrust collar abuts said stop means, said bearing transmitting the loads from said planet pinion carrier directly to said input member.

2. In a device for converting rotary motion to linear motion at a differential speed, a rotary input member, a planetary change-speed gear set including a sun gear driven by the input member, a fixed ring gear, a carrier, a plurality of planet pinions interposed between the ring gear and the sun gear and carried by said carrier for planetating movement, a bearing interposed between said carrier and said input member, a screw operatively connected to said carrier to be driven thereby, said screw having a peripheral thread of appreciable axial lead, a plurality of thrust elements engaging the thread of said screw for axial and planetating movement relative thereto, a thrust collar in thrust relation with said elements for only axial movement relative to said screw, and stop means on said carrier abuttable with said thrust collar for limiting movement of the collar in either axial direction.

3. In a device for converting rotary motion to linear motion at a differential speed, a rotary input member, a planetary change-speed gear set including a sun gear driven by the input member, a fixed ring gear, a carrier, and a plurality of planet pinions interposed between the ring gear and the sun gear and carried by said carrier for planetating movement, bearing means for supporting said carrier for rotation, a screw operatively connected to said carrier to be driven thereby, said screw having a peripheral thread of appreciable axial lead, a plurality of thrust elements engaging the thread of said screw for axial and planetating movement relative thereto, a thrust collar in thrust relation with said elements for only axial movement relative to said screw, and stop means on said carrier abuttable with said thrust collar for limiting movement of the collar in either axial direction.

References Cited in the file of this patent

UNITED STATES PATENTS

| | | |
|---|---|---|
| 2,445,384 | Bousky | July 20, 1948 |
| 2,446,393 | Russell | Aug. 3, 1948 |
| 2,480,212 | Baines | Aug. 30, 1949 |
| 2,486,242 | Ashton | Oct. 25, 1949 |
| 2,682,780 | Pickles | July 6, 1954 |
| 2,806,383 | Geyer | Sept. 17, 1957 |
| 2,891,413 | Millns | June 23, 1959 |